United States Patent [19]

Ström

[11] 4,202,568
[45] May 13, 1980

[54] TUBE JOINT

[75] Inventor: Torsten E. T. Ström, Fristad, Sweden

[73] Assignee: AB Gustavsberg, Fristad, Sweden

[21] Appl. No.: 888,418

[22] Filed: Mar. 20, 1978

Related U.S. Application Data

[63] Continuation of Ser. No. 725,451, Sep. 22, 1976, abandoned.

[30] Foreign Application Priority Data

Sep. 25, 1975 [SE] Sweden .............................. 7510733
Feb. 4, 1976 [SE] Sweden .............................. 7601178

[51] Int. Cl.² ...................... F16L 23/00; F16L 47/00
[52] U.S. Cl. .................... 285/336; 29/157 R;
29/416; 29/455 R; 285/365; 285/DIG. 4
[58] Field of Search ............... 285/336, 365, 407, 408,
285/409, 411, DIG. 4, 367, 366; 24/20 EE, 20
TT, 201 HE; 29/416, 157 R, 455 R

[56] References Cited

U.S. PATENT DOCUMENTS

| 144,997 | 11/1873 | Mayall | 285/336 |
| 411,130 | 9/1889 | Robinson | 285/409 |
| 544,943 | 8/1895 | Woodside | 285/407 X |
| 3,240,501 | 3/1966 | Smith | 285/367 X |
| 3,259,262 | 7/1966 | Grossman et al. | 24/20 EE X |
| 3,498,649 | 3/1970 | Pfeuffer | 285/336 X |
| 3,951,439 | 4/1976 | Schmunk | 285/336 X |
| 4,037,626 | 7/1977 | Roberts, Jr. | 285/DIG. 4 X |

FOREIGN PATENT DOCUMENTS

| 2029727 | 11/1971 | Fed. Rep. of Germany | 285/367 |
| 2321315 | 3/1975 | Fed. Rep. of Germany | 285/DIG. 4 |
| 630008 | 12/1961 | Italy | 24/20 TT |
| 309656 | 4/1929 | United Kingdom | 285/367 |

Primary Examiner—Thomas F. Callaghan
Attorney, Agent, or Firm—Finnegan, Henderson, Farabow, Garrett & Dunner

[57] ABSTRACT

In a joint between two tubes having a corrugated outer wall and a smooth or corrugated inner wall the tubes are cut to form each an open annular space between said walls at the end. A sealing ring is received by the spaces, and the tubes are pressed against the sealing ring by means of a lock ring tightened about the tube ends.

15 Claims, 6 Drawing Figures

TUBE JOINT

This is a continuation of application Ser. No. 725,451, filed Sept. 22, 1976, and now abandoned.

The invention relates to a joint between tubes having a double wall structure comprising a corrugated outer wall and a smooth or reversedly corrugated inner wall joining the inside crests of the outer wall, and a lock ring applied around the tube ends and engaging the corrugated outer wall of each tube.

An object of the invention is to provide a simple joint between tubes of the kind referred to wherein the specific characteristics of such tubes are utilized and which comprises a minimum of elements so that the joint will be of a simple structure and thus can be produced at low costs.

Another object is to provide a tube joint of the kind referred to which can easily be mounted and demounted.

A further object is to provide a tube joint which provides a reliable seal and connection between the tubes.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the foregoing objects and in accordance with the purpose of the invention, as embodied and broadly described herein, there is provided a joint between tubes having a corrugated outer wall and a corrugated inner wall joining the inside crests of the outer wall, comprising an annular space formed by the inner and outer walls of each tube at the end thereof and opening in a plane passing transversely through the crest of the outer wall, an annular sealing ring received by said spaces and extending between the adjacent ends of the tubes, and a lock ring applied around the tube ends and engaging the corrugated outer wall of each tube to press by cam action the tube ends against the intermediary sealing ring from opposite sides thereof when tightened about the tube ends.

The accompanying drawings, which are incorporated in and constitute a part of this specification, illustrate an embodiment of the invention and, together with the description, serve to explain the principles of the invention.

Figure 1:
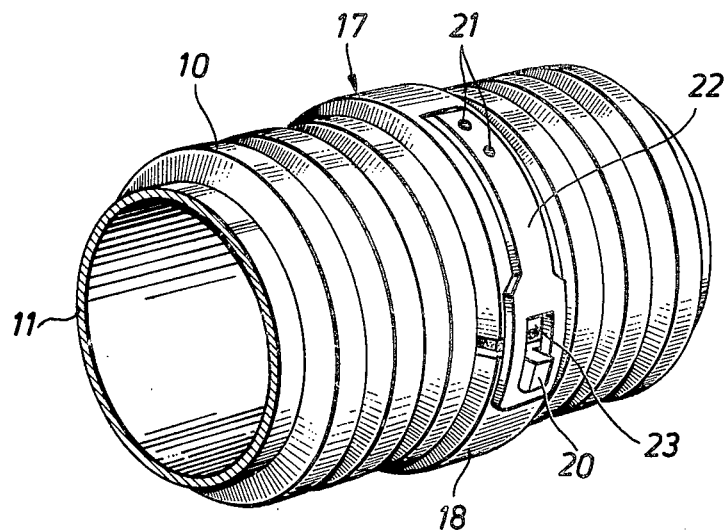
FIG. 1 is a perspective view of the tube joint according to the teachings of the invention.
Figure 2:
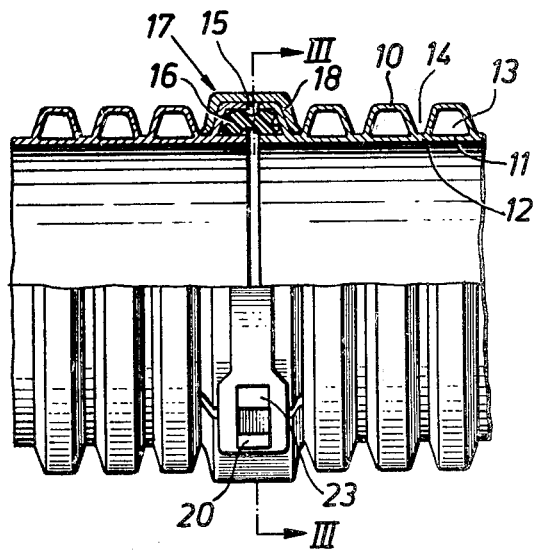
FIG. 2 is a view partly in elevational side view and partly in longitudinal sectional view of the tube joint.
Figure 3:
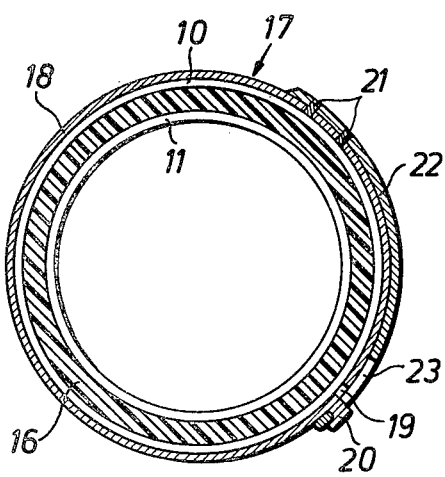
FIG. 3 is a cross sectional view of the tube joint along line III—III in FIG. 2.
Figure 6:
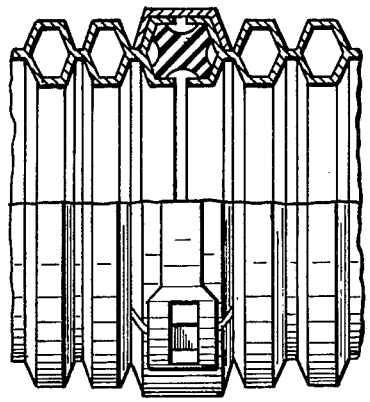
FIG. 6 is a view partly in elevational side view and partly in longitudinal sectional view of a modified tube joint.

The two pipes joined are of a double wall structure well-known per se and comprise each a corrugated outer wall 10 e.g. of extruded and then in moulds vacuum formed plastic material, and a smooth cylindrical inner wall 11 also of extruded plastic material, which is connected or fused to the inside crests of the corrugated outer wall at 12 so that the double wall structure comprises a number of circumferential annular spaces 13 each closed individually, and grooves 14 provided therebetween. In the embodiment illustrated in FIGS. 1 and 2 the corrugation of the outer wall is substantially of trapezoid cross sectional form but other forms are conceivable. A smoothly corrugated outer wall having substantially sinusoidal curvature is not uncommon in connection with tubes of the kind referred to, and it is of course also conceivable to combine a corrugated outer wall with an inner wall also corrugated, which is reversed in relation to the outer wall and the outside crests of which are connected or fused to the inside crests of the outer wall as shown in FIG. 6. In said latter case the corrugation of the inner wall must not necessarily follow that of the outer wall; however, the pitch of the inner wall should be the same as that of the outer wall.

Each tube end terminates in a plane which passes through a crest of the outer wall. However, it is not necessary that this plane passes through the centre of the crest in case this crest, as shown, is of trapezoid cross sectional form and it is not necessary that it passes through the top of the crest in case the corrugation is sinusoidal or has a similar form. Terminating as described each tube end forms an annular space 15 open at the end and defined between the outer and inner walls said space receiving a sealing ring 16 such as a ring of elastic material e.g. rubber or plastic which is received partly by the space in one tube end and partly by the space in the other tube end. However, the tube ends are mutually spaced before they are clamped together as will be described below so that they can be pressed against each other the sealing ring being squeezed between the tube ends. In the embodiment disclosed sealing ring 16 is of substantially X-formed cross sectional form which is preferred since the arms of the profile are brought to seal effectively against the corners of spaces 15 receiving the sealing ring when the tube ends are pressed together.

Figure 4:
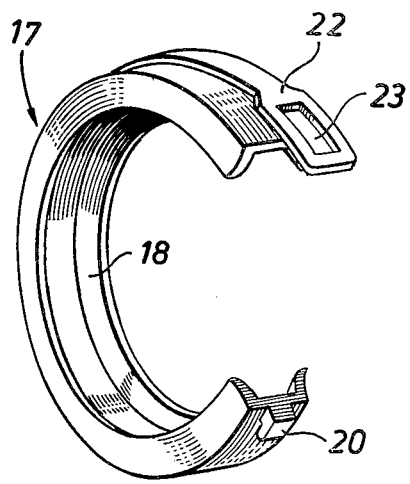
FIG. 4 is a perspective view of the lock ring forming part of the joint, in opened or disengaged condition.
Figure 5:
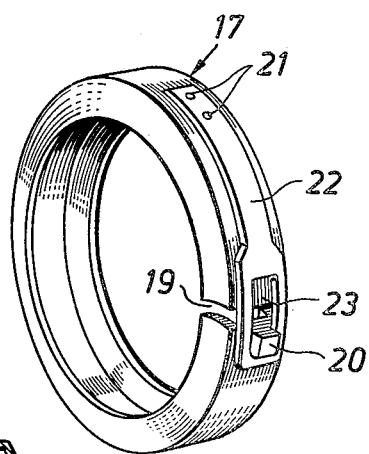
FIG. 5 is a perspective view of the lock ring in closed or engaged condition.

The tube ends are pressed together by means of an external lock ring 17 which is disclosed in FIGS. 4 and 5 and comprises a slotted ring 18 e.g. of plastic or metal which is channelled in cross section and the flanges of which diverge towards the free ends thereof. At one side of the slot designated 19 the ring is formed with a hook 20 or other projection on the outside thereof close to the slot. At the other side of the slot there is connected to ring 18 by means of rivets 21 a straplike flap 22 of plastic or metal sheet. This flap is disposed on the outside of the ring and joins the ring substantially tangentially spaced about 90° from the slot. It projects freely from the ring towards the slot and beyond the adjacent end of the ring. To the major part thereof the flap is spaced from the ring but it is flexible towards and away from the ring. At the free end thereof which has a greater width than the rest of the flap, the flap forms a rectangular opening 23 which extends in the longitudinal direction of the flap and is sufficiently large to receive hook 20.

By further expansion of lock ring 17 from the condition disclosed in FIG. 4 the lock ring can be applied over the two tube ends transversely to receive the two terminating crests thereof which each form a space 15, between the flanges of ring 18. Then, lock ring 17 is tightened circumferentially about the tube ends by means of pliers, a screwdriver or another suitable tool, and hook 20 is engaged with slot 23 in flap 22 so that the lock ring will be brought to the closed condition shown in FIGS. 1, 2, 3 and 5.

Sealing ring 16 should have such a width that the two terminating crests, when the sealing ring is not squeezed, are spaced a distance determined by the sealing ring, which allows the lock ring to be thread transversely over the terminating crests at the outer ends of the ring flanges. Then, when the lock ring is being tightened about the tube ends as described the flanges of slotted ring 18, diverging towards the free ends thereof, slide along the inclined sides of the terminating crests so that the tube ends are moved axially towards each other by cam action between the tubes and the lock ring the tubes being pressed against the sealing ring 16 which is squeezed and substantially fills the annular spaces 15, spanning the joint between the tubes to provide a seal therebetween.

By using a sealing ring and a lock ring there is thus provided a joint between the tubes by utilizing the specific wall structure without the necessity to form the tubes in any specific way in the area of the joint. The tubes can be cut at any place of the length thereof through a crest and can be joined according to the principles of the invention by using particularly simple means for obtaining the necessary seal between the tube ends.

It will be apparent to those skilled in the art that various other modifications and variations in addition to those mentioned above could be made in the tube joint of the invention without departing from the scope and spirit of the invention.

I claim:

1. A combination tube joint consisting essentially of a joint including two aligned adjacent extruded nometallic tubes each having a corrugated outer wall and a reversibly corrugated inner wall, said corrugations extending along the entire length of said tubes, the roots of the corrugations of the inner wall and the outer wall being joined, an annular space formed by the inner and outer walls of each tube at the end of said tube and opening in a plane passing transversely through the crest of the outer wall, an annular intermediary sealing ring disposed within said space in each tube and extending between the aligned adjacent ends of the tubes, and a lock ring applied around the tube ends and engaging the corrugated outer wall of each tube to press by cam action the tube ends against the intermediary sealing ring from opposite sides of said sealing ring when tightened about the tube ends.

2. A tube joint as claimed in claim 1 wherein the lock ring has channelled cross sectional form, the flanges of which are arranged to engage the inclined sides of the corrugated outer wall in order to press the tube ends towards each other, by cam action, when the lock ring is tightened about the tubes.

3. A tube joint as claimed in claim 2 wherein the lock ring comprises a slotted flexible ring having a hook on one side of the slot and an external straplike flap on the other side of the slot, connected to the ring and projecting freely from a position spaced from the end of the ring, and beyond said end, said flap being flexible towards and away from the ring to be engaged with and disengaged from the hook at an opening arranged at the free end of the flap.

4. A tube joint as claimed in claim 3 wherein the straplike flap joins the ring substantially tangentially.

5. A tube joint as claimed in claim 3 wherein the straplike flap joins the ring at a position spaced substantially 90° from the slot.

6. A tube joint as claimed in claim 1, wherein said tubes are made of plastic.

7. A combination tube joint consisting essentially of a joint including two aligned adjacent extruded nonmetallic tubes each having a corrugated outer wall and a smooth inner wall joining the roots of the corrugations of the outer wall, said corrugations extending along the entire lengths of said tubes, an annular space formed by the inner and outer walls of each tube at the end of said tube and opening in a plane passing transversely through the crest of the outer wall, an annular intermediary sealing ring disposed within said space in each tube and extending between the aligned adjacent ends of the tubes, and a lock ring applied around the tube ends and engaging the corrugated outer wall of each tube to press by cam action the tube ends against the intermediary sealing ring from opposite sides of said sealing ring when tightened about the tube ends.

8. A tube joint as claimed in claim 7, wherein the lock ring has channelled cross sectional form, the flanges of which are arranged to engage the inclined sides of the corrugated outer wall in order to press the tube ends towards each other, by cam action, when the lock ring is tightened about the tubes.

9. A tube joint as claimed in claim 8 wherein the lock ring comprises a slotted flexible ring having a hook on one side of the slot and an external straplike flap on the other side of the slot, connected to the ring and projecting freely from a position spaced from the end of the ring, and beyond said end, said flap being flexible towards and away from the ring to be engaged with and disengaged from the hook at an opening arranged at the free end of the flap.

10. A tube joint as claimed in claim 9, wherein the straplike flap joins the ring substantially tangentially.

11. A tube joint as claimed in claim 9, wherein the straplike flap joins the ring at a position spaced substantially 90° from the slot.

12. A tube joint as claimed in claim 7, wherein said tubes are made of plastic.

13. A method of forming a joint between two extruded double-walled nonmetallic corrugated tubes consisting essentially of:
    (a) extruding and forming corrugations along the length of at least the outer walls of said tubes;
    (b) cutting each of said tubes transversely through a crest of the outer wall to expose an annular space between the inner and outer walls of each tube;
    (c) adjacently aligning said annular spaces and disposing an annular intermediary sealing ring extending within said aligned spaces of each tube; and
    (d) applying and tightening a lock ring around the ends of said tubes engaging the corrugated outer wall of each tube to press by cam action the tube ends against the intermediary sealing ring from opposite sides of said sealing ring, said lock ring remaining substantially out of contact with said sealing ring.

14. A method of forming a joint between two extruded double-walled nonmetallic corrugated tubes consisting essentially of:
    (a) providing said tubes, said tubes having corrugations along the length of at least their outer walls;

(b) cutting each of said tubes transversely through a crest of the outer wall to expose an annular space between the inner and outer walls of each tube;

(c) adjacently aligning said annular spaces and disposing an annular intermediary sealing ring extending within said aligned spaces of each tube; and (d) applying and tightening a lock ring around the ends of said tubes engaging the corrugated outer wall of each tube to press by cam action the tube ends against the intermediary sealing ring from opposite sides of said sealing ring, said lock ring remaining substantially out of contact with said sealing ring.

15. The method of claim 13 or claim 14, wherein said tubes are made of plastic.

* * * * *